Sept. 9, 1952 R. F. SMITH 2,609,892
BRAKE
Filed Oct. 26, 1948 2 SHEETS—SHEET 1

INVENTOR.
Robert F. Smith
BY
Harness and Harris
ATTORNEYS.

Sept. 9, 1952 R. F. SMITH 2,609,892
BRAKE
Filed Oct. 26, 1948 2 SHEETS—SHEET 2
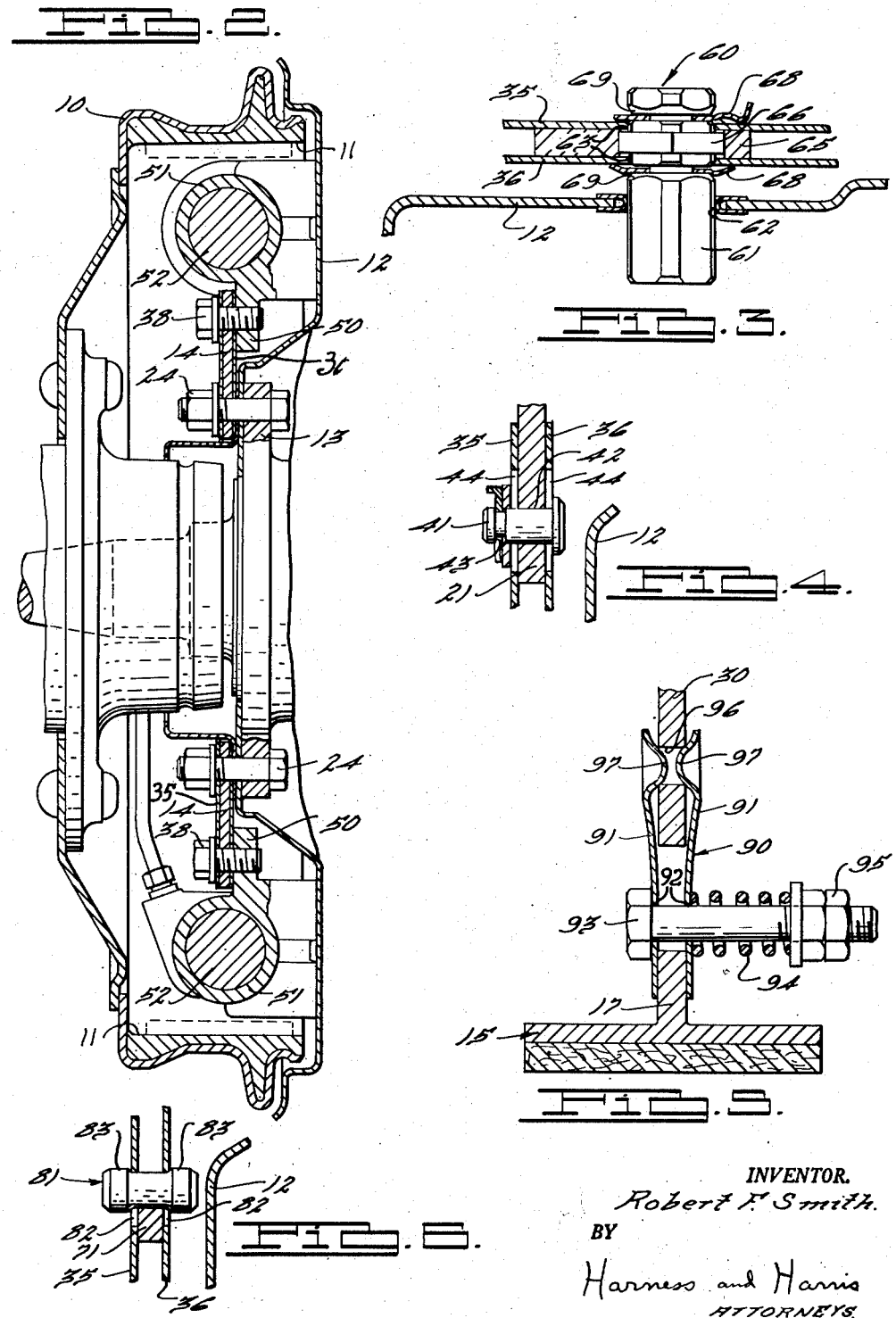
INVENTOR.
Robert F. Smith.
BY
Harness and Harris
ATTORNEYS.

Patented Sept. 9, 1952

2,609,892

UNITED STATES PATENT OFFICE 2,609,892

BRAKE

Robert F. Smith, Detroit, Mich., assignor to Chrysler Corporation, Highland Park, Mich., a corporation of Delaware Application October 26, 1948, Serial No. 56,555

12 Claims. (Cl. 188—78)

This invention relates to friction brake assemblies of the type having pivotally mounted, link supported, self-adjusting, brake shoes which are adapted to be spread into engagement with the flange portion of an encircling, rotatable, brake drum.

It is a primary object of this invention to provide an improved and simplified form of brake assembly composed primarily of stamped elements which are arranged in such a manner that the brake shoe actuating mechanism is balanced and free from torsional loads or turning moments which might cause tilting or cocking of the brake shoes and loss of pedal travel during application of the brakes.

It is a further object of this invention to provide a brake assembly in which the complete shoe actuating mechanism is mounted on a single supporting member which member is centrally arranged and aligned with the webs of the brake shoes and with the actuating means for the shoes.

It is an additional object of this invention to provide a brake assembly in which the majority of the elements have been simplified in design so that they may be formed from stampings thereby making the brake assembly unit economical to manufacture and install, yet highly efficient as to braking action, and extremely durable in service.

It is an additional object of this invention to provide a multi-shoe brake assembly in which the several shoes and the actuating linkages therefore are identical in design and readily interchangeable.

It is a further object of this invention to provide a brake assembly in which the spider member supports the complete shoe actuating mechanism, the construction being such that separate brake shoe anchor bolts are no longer required.

It is another object of this invention to provide an adjusting means for setting the clearance between the brake shoes and the brake drum which means is centrally located with respect to, and aligned with the brake shoe webs so as to prevent the development of torsional loads or turning moments that would tend to cock the brake shoes.

It is another object of this invention to provide a brake assembly in which the movable brake shoes are positively guided during all movement and retained in their most efficient braking position during brake application.

Additional objects and advantages of this invention will be apparent from a reading of the attached specification and a consideration of the related drawings wherein:

Fig. 3 is a sectional elevation taken along the line 3—3 of Fig. 1 disclosing the eccentric cam means for adjusting the clearance between the brake shoes and brake drum;

Fig. 4 is a sectional elevation taken along the line 4—4 of Fig. 1 disclosing the pin connection between a pair of the guide plates and the web of the brake shoe positioned between the guide plates;

Fig. 5 is a sectional elevation taken along the line 5—5 of Fig. 1 disclosing the friction pivot connection between a brake shoe pivot link and the web of the associated brake shoe;

Fig. 6 is a sectional elevation taken along the line 6—6 of Fig. 1 disclosing the pin means for anchoring the brake shoe return springs in their tensioned, assembled positions; and Fig. 7 is a diagrammatic view showing a proposed application of the applicant's brake assembly to a conventional motor vehicle brake system.

Figures 1, 2:
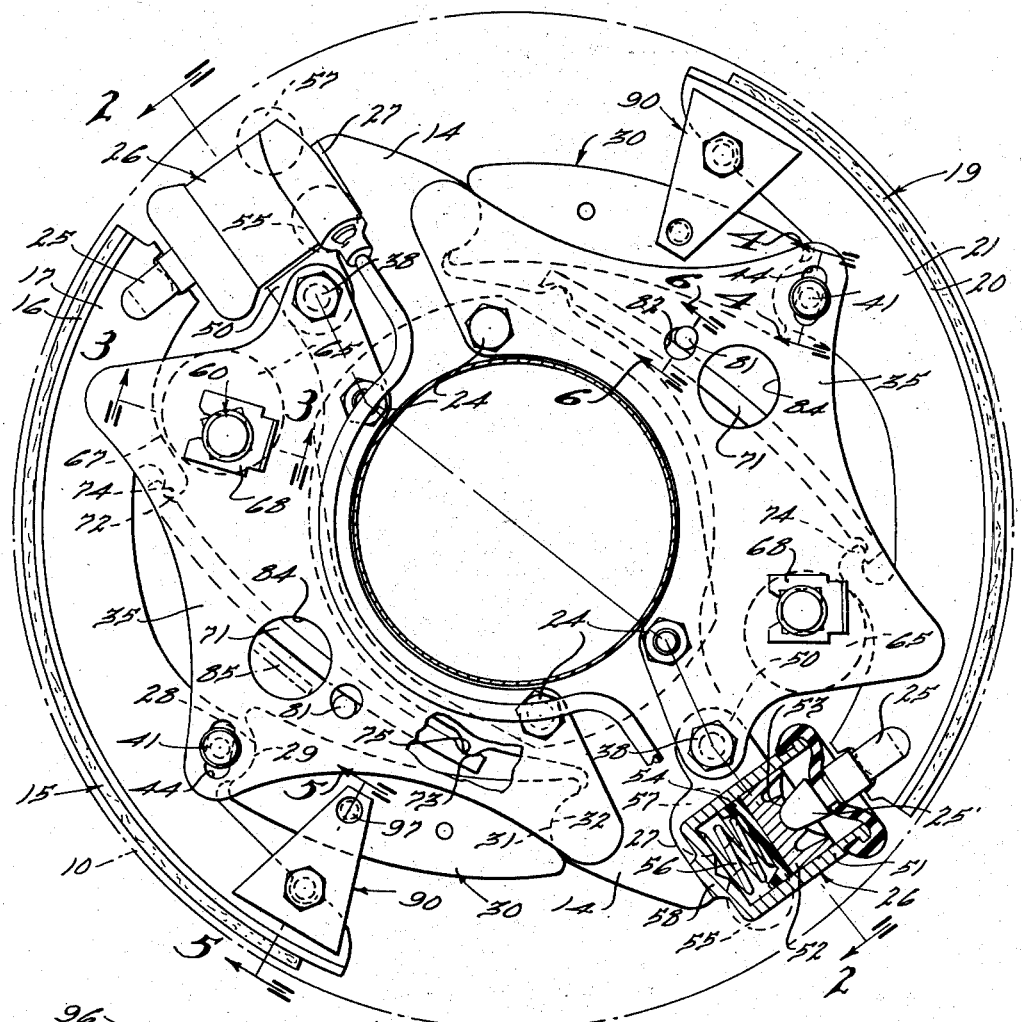
Fig. 1 is a side elevation of a brake assembly embodying this invention, with parts being broken away and shown in sectional elevation.
Fig. 2 is a sectional elevation taken along the line 2—2 of Fig. 1 clearly disclosing the brake assembly supporting means.

Referring to the drawings in detail, the brake assembly embodying my invention includes an annular brake drum 10 which is adapted to be secured to a rotatable member to be braked, such as the road wheel of a motor vehicle. The numeral 12 designates a plate for enclosing the open side of the drum 10, plate 12 being adapted to be mounted on a relatively fixed supporting member 13, such as the rear axle housing or the front steering knuckle of a vehicle chassis, depending on whether the brake assembly is for a rear or front vehicle wheel. Plate 12 in this construction serves only as a dust cover for the brake assembly due to the fact that the spider member 14, supporting the brake actuating mechanism, is designed to function as the torque plate to resist the brake reaction between the brake shoes and brake drum.

The complete brake actuating mechanism for each wheel assembly is mounted on the spider member 14 which is parallel with and disposed between the web of the drum 10 and the plate 12. Spider 14 extends in a plane normal to the axially extending braking surface 11 of drum 10. Spider 14 is adapted to be secured to the relatively fixed supporting member 13 by the nut and bolt means 24. By such an arrangement the complete brake actuating mechanism may be assembled on the spider 14 as a packaged unit and this spider supported unit installed in the wheel assembly in a quick, easy manner.

Movably mounted on the spider member 14 are a pair of arcuate brake shoes 15 and 19, each of which has a lined peripheral flange, 16 and 20 respectively, adapted to be frictionally engaged with the inner cylindrical surface of the brake drum 10. Brake shoes 15 and 19 each have a centrally disposed web portion, 17 and 21 respectively, which portion has its opposite ends connected to the spider member 14 by the pivoted link 30 and by the fluid actuating motor 26 respectively.

As the actuating mechanism for each of the brake shoes is identical, only that for shoe 15 will be described. Brake shoe 15 has its web portion 17 at the upper or toe end connected to a plunger 25 that is actuated by the movable piston 52 of fluid motor 26. Fluid motor 26 is the so-called wheel cylinder of a conventional hydraulic brake system. Motor 26 comprises a cylinder 51 having slidably mounted therein the piston 52. Piston 52 is formed with a concave seat 53 adapted to engage the rounded end 25' of plunger 25. Resilient seal 54 is mounted on the face of piston 52 to prevent leakage of the pressure fluid between the piston and cylinder walls. Pressure fluid is admitted to the cylinder 51 through the port 55. Spring means 56 normally urges the seal 54 against the piston face. Ports 57 provide bleed holes for the hydraulic system. Motor 26 is mounted in an L-shaped seat 27 in the edge of spider 14 and is secured in this position by the bolt 38 which connects the ear 50 of motor 26 to the adjacent portion of spider 14. The closed end 58 of the motor cylinder 51 abuts against an edge portion of seat 27 which provides a rigid anchor to take the brake reaction transmitted to the motor 26 from the shoe 15. Motor 26 is mounted on the spider member 14 in such a manner that the central portion of plunger 25 lies in the same plane as the spider 14 and the web 17 of shoe 15 therefore application of the brakes causes plunger 25 to exert a direct thrust against the centrally disposed web 17 of the shoe 15 and this prevents the development of torsional loads or turning moments which might have a tendency to tilt or cock the brake shoe.

The web 17 of shoe 15, at the heel or lower end, is formed with a rounded projection 28 that is adapted to seat in the concavely shaped end 29 of the pivot link 30. Link 30 extends in the same plane as the web 17 of shoe 15 and has its opposite end formed with a concavely shaped seat 31 adapted to be mounted on a rounded projection 32 extending from an edge of spider member 14. The curved bearing seats between the shoe web 17, the pivoted link 30 and the spider 14 permit relative pivotal movement between these engaged elements. It will be noted that this construction eliminates separate anchor bolts for the brake shoes and materially simplifies the brake assembly.

Mounted on each side of the web 17 and link 30 are a pair of guide plates 35, 36 which maintain the brake shoe 15, link 30 and spider 14 in aligned, assembled, condition. Guide plates 35 and 36 are secured in position by the bolt and nut means 24 which mounts the spider on the supporting member 13, and by the bolt means 38 which mount the fluid motors 26 on the spider 14. Guide plates 35 and 36 extend beyond the periphery of the spider so as to form channels around the side edges of the spider member to receive the pivot links 30 and other associated mechanism.

Pin means 41, see Fig. 4, extending through aligned slots 44 in the guide plates 35 and 36, and through an aperture 42 in the web of the brake shoe, retains the shoe 15, pivot link 30, guide plates 35 and 36 and spider 14 in assembled condition and facilitates handling of the spider supported brake actuating mechanism as a packaged unit. Wire clip 43 locks the pin 41 in assembled position.

This brake assembly includes a simple, economically manufactured and assembled means for adjusting the clearance between the lined flanges of the brake shoes and the brake drum. This means comprises an eccentric adjusting means 60 (see Fig. 3) which consists of a square shank stud 61 insertable through an opening 62 in the dust plate 12 and through aligned openings 63 in the guide plates 35 and 36. The square portion 66 of the stud 61, located between the guide plates 35 and 36, has an eccentric cam 65 fixedly mounted thereon. The side edge of cam 65 is adapted to engage an edge portion 67 of the brake shoe web portion to provide for camming of the shoe into adjusted position. Spring plate washers 68 are engaged with annular recesses 69 on the stud 61 to retain the eccentric brake shoe adjusting means in its assembled position. Plate washers 68 have portions bearing against the guide plates 35 and 36 so as to provide means for retaining the stud 61 in its adjusted position. The cam means 65, engaging the edges of the centrally disposed brake shoe web portion 17, can not produce a turning moment that would tend to tilt or cock the brake shoe therefore a balanced brake shoe clearance adjusting means is provided.

A novel means has been provided for retracting the brake shoes to disengaged position. This means comprises the concavely arched spring strip 71 which has depressed seats 72 and 73 at each end thereof. Seat 72 is mounted on a projecting finger 74 extending from the web 17 of the brake shoe 15 and seat 73 is mounted on a projecting finger 75 extending from a side edge of spider 14. After seating the spring strip 71 on the fingers 74 and 75 the strip 71 is bent inwardly towards the spider 14 until the aligned holes 82 (see Fig. 6) in the guide plates 35 and 36 will permit the pin 81 to be inserted therethrough so as to lock the strip 71 in a tensioned, assembled, position. With the spring strip 71 assembled as shown it is obvious that on application of the brakes the brake shoe will be forced outwardly and this will bend strip 71 over pin 81, the strip 71 functioning as a cantilever beam at this time. Release of the braking pressure will permit the stressed spring strip 71 to retract the extended brake shoe and hold the shoe in its disengaged position. To facilitate assembly of the spring strips 71 applicant forms the guide plates 35 and 36 with aligned holes 84. A flat rigid bar, such as the bar indicated by numeral 85 (see Fig. 1), can be inserted through the holes 84 and then twisted ninety degrees so as to spring the strip 71 inwardly and hold it in this tensioned position while the pin 81 is being mounted in the holes 82 in the guide plates 35 and 36. From Fig. 6 it will be noted that the pin 81 has shoulder portions 83 at each end which engage the outer sides of the guide plates 35 and 36 so as to prevent the guide plates from separating.

The pivotally mounted link 30 supporting the heel end of the brake shoe provides a self-energizing, self-aligning, brake shoe construction that secures maximum braking efficiency with minimum pedal pressure. To insure that the brake shoe will normally pivot about the anchor pivot seat 32, rather than about the pivot seat 29, and to properly guide the movement of the brake shoe, the spring-pressed guide means 90 is provided between the web of the brake shoe and the associated link 30. This means 90 (see Fig. 5), for guiding the movement of the brake shoe and restraining relative pivotal movement between the brake shoe and pivot link, comprises a pair of friction plates 91 positioned against opposite sides of the brake shoe web portion and the associated pivot link. Plates 91 are formed with aligned apertures 92 through which a bolt 93 extends. Mounted on bolt 93 is a spring 94 which may be placed under compression by the nut and washer means 95 mounted on the threaded end of bolt 93. Compression of spring 94 presses the plates 91 against the sides of the brake shoe web portion 17 and against the sides of the pivot link 30 and thereby frictionally restrains relative movement between these members. Link 30 is formed with an aperture 96 in which depressed portions 97 of plates 91 are adapted to seat. The seating of portions 97 in the aperture 96 provides a pivot point about which the plates 91 may turn in the event conditions are such as to necessitate relative pivotal movement of the brake shoe with respect to the pivot link 30. The portions 96—97 also prevent movement of the plates 91 along the link 30 and thereby retain the shoes and links in assembled position. It will be noted that the means 90 not only serves the dual function of restraining relative pivotal movement between the brake shoe 15 and the pivot link 30 and also guiding the movement of the shoe 15, but furthermore, it holds these associated members together and in alignment and prevents cocking or tilting of the brake shoe. As a result of the friction plate construction for controlling relative pivotal movement of the link 30 and associated brake shoe, the angular relation of these members may vary to obtain the most effective frictional engagement between the shoe flange and the brake drum without the occurrence of undesired rotation of the pivot links 30. This principle is explained in detail in the U. S. patent to L. C. Huck, No. 1,886,811.

Fig. 7 diagrammatically shows the application of this brake shoe assembly to a conventional motor vehicle hydraulic brake system. The front wheel assemblies 96 and 97 are identical to the brake assembly shown in Fig. 1. The rear wheel assemblies 98 and 99 are identical to the front wheel assemblies except for the fact that a single, double piston, wheel cylinder is used to actuate the brake shoe linkages instead of the two single piston wheel cylinders used in the front wheel assemblies. With the arrangement herein shown six self-energizing, self-adjusting brake shoes are available for braking during forward drive of the vehicle and on reverse drive two self-energizing, self-adjusting brake shoes are available for braking action. By this arrangement the majority of the braking action, which occurs during forward drive, is evenly spread over six self-energizing, self-adjusting shoes and accordingly the braking effect is improved and the wear of the shoe linings kept to a minimum. In both the front and rear wheel brake assemblies the same type of brake shoes and supporting linkages are used therefore all shoes are interchangeable and this facilitates manufacture and assembly of the brake assemblies.

Thus it will be seen that applicant has provided a guided shoe brake assembly that is highly efficient in braking operation, extremely easy and economical to manufacture and install, easily assembled, repaired or reconditioned due to the detachability of the complete brake shoe actuating mechanism, and free of torsional loads or turning moments that would tend to cock the brake shoes and create unnecessary stresses and strains in the brake assembly.

I claim:

1. In a brake, a rotatable brake drum having an axially extending braking surface, a fixed support, a spider member mounted on said support so as to extend in a plane normal to the braking surface of said drum, a brake shoe having a lined flange portion adapted to be frictionally engaged with the braking surface of said drum and a single web portion normal to and positioned centrally of the width of said flange portion, said web portion extending in the plane of said spider member, guide plates mounted on said spider and positioned to extend along and embrace the side surfaces of said spider and said brake shoe web portion to guidingly retain said spider and brake shoe web portion in aligned relationship, a pivot link positioned between and guidingly embraced by said guide plates, said pivot link being pivotally connected between one end of the brake shoe web portion and said spider, and brake shoe actuating means mounted on said spider and connected to the other end of said brake shoe, said actuating means being arranged to apply braking force to said shoe in the plane of said spider and shoe web.

2. A brake as defined by claim 1 wherein the side edges of the brake shoe web portion and the spider are formed with pivot seat portions engageable with complementary seat portions formed on the end edges of the pivot link so as to provide mating journal means for accommodating relative pivotal movement between the brake shoe, pivot link and spider.

3. A brake as defined by claim 1 including frictionally engaged plate means extending along the side surfaces of and connecting the brake shoe web portion and the pivot link to restrain relative movement between the shoe and link, said frictionally engaged means also providing means for guiding the movement of the brake shoe relative to the pivot link.

4. A brake as defined by claim 1 including brake shoe retracting means comprising a resilient member mounted between the guide plates and connected between the brake shoe and the spider.

5. A brake as defined by claim 1 including an adjusting means for setting the clearance between the brake shoe flange and the brake drum braking surface when the shoe is in a retracted position, comprising a cam member adjustably mounted between the guide plates having portions adapted to engage the side edge of the brake shoe web portion located between said guide plates.

6. A brake as defined by claim 1 including pin means connecting the web portion of the brake shoe to the guide plates for relative movement therebetween while retaining the brake shoe, pivot link and guide plates in assembled condition on the spider.

7. A brake as defined by claim 1 wherein the brake shoe actuating means comprises a fluid motor mounted in a seat formed in the spider member and provided with a movable plunger connected to the web of the brake shoe, said plunger providing a thrust transmitting member that extends in the plane of the spider and brake shoe web portion.

8. In a brake assembly, a rotatable brake drum having an axially extending braking surface, a support, a spider member detachably connected to said support and extending in a plane normal to the braking surface of said drum, a pair of diametrically arranged, brake shoe actuating motors mounted in indented seats in the side edges of said spider member, movable plunger members carried by said motors having thrust transmitting portions extending in the plane of said spider, a pair of diametrically arranged brake shoes each having a flange portion adapted to be frictionally engaged with the braking surface of said drum and a web portion extending normal to and positioned centrally of the width of said flange portion, means connecting the web portion at one end of each shoe to one of the thrust transmitting portions of said plunger members, links arranged in the plane of the shoe web portions and the spider connected between the web portion at the other end of each shoe and the spider member, guide plates mounted on the opposite side surfaces of said spider member embracing and extending along the side surfaces of said links and said brake shoe web portions to maintain said spider, links and shoe web portions in aligned relationship, resilient means mounted between said guide plates and connected between said spider and each of said shoe web portions adapted to urge said shoes to retracted positions, and means frictionally engaged between said shoe web portions and said links to restrain relative pivotal movement between the shoes and links and guidingly control relative movement therebetween.

9. In a brake assembly, a rotatable brake drum having an axially extending braking surface, a support, a spider member detachably connected to said support and extending in a plane normal to the braking surface of said drum, a pair of diametrically arranged, brake shoe actuating motors mounted in L-shaped seats in the side edges of said spider member, movable plunger members carried by said motors having thrust transmitting elements extending in the plane of said spider, a pair of diametrically arranged brake shoes each having a flange portion adapted to be frictionally engaged with the braking surface of said drum and a single web portion extending normal to and positioned centrally of said flange portion, means connecting the web portion at one end of each shoe to one of the thrust transmitting elements of said plunger members, a link pivotally connected between the web portion at the other end of each shoe and the spider member, guide plates mounted on the opposite side surfaces of said spider member and extending along and embracing the side surfaces of said links and said brake shoe web portions to maintain said spider, links and shoe web portions in aligned relationship, resilient means mounted between said guide plates and connected between said spider and each of said shoe web portions adapted to urge said shoes to retracted positions, and plate means frictionally engaged between the side surfaces of said shoe web portions and said links to restrain and guide relative pivotal movement between the shoes and links, and adjustable cam means mounted between said guide plates having portions adapted to engage the side edges of the shoe web portions to provide means for setting the clearance between the braking surfaces of said shoes and said drum when said shoes are retracted.

10. In a brake assembly, a rotatable brake drum having an axially extending braking surface, a support, a spider member detachably connected to said support, a pair of spaced-apart plate members projecting from the periphery of said spider member and arranged to extend in a plane normal to the braking surface of said drum, a pair of anchor seats formed on the peripheral side edges of said spider member between said plates, a pair of oppositely arranged L-shaped indentations formed in the side edges of each of said plate members, brake shoe actuating motors mounted in the L-shaped seats of said plate members, projections on said motors connected to said plate members and said spider, movable plunger members adapted to be actuated by said motors having thrust transmitting portions arranged to extend in a plane located between and parallel to said plate members, a pair of oppositely arranged brake shoes each having a flange portion adapted to be frictionally engaged with the braking surface of said drum and a web portion extending normal to and centrally of the width of said flange portion, said web portion projecting between and embraced by said plate members for guided movement relative thereto, means connecting a web portion of each shoe to a plunger member thrust transmitting portion, a pair of links positioned between and guidingly embraced by said plate members, each link having one end pivotally connected to the edge of the web portion of a brake shoe, the edge of the other end of each of said links being pivotally connected to an anchor seat, resilient means positioned between said plates and connected between said spider member and an edge of each of said shoe web portions adapted to urge said shoes to retracted positions, and plate means frictionally embracing the side surfaces of said shoe web portions and said links to restrain and guide relative pivotal movement between the shoes and links.

11. In a brake assembly, a rotatable brake drum having an axially extending braking surface, a support, a spider member connected to said support, a pair of spaced-apart, parallel plate members projecting from the periphery of said spider member and arranged to extend in a plane normal to the braking surface of said drum, a pair of anchor seats formed on the side edges of said spider member between said plates, a pair of oppositely arranged indentations formed in the side edges of each of said plate members, brake shoe actuating motors mounted in the indentations of said plate members, projections on said motors connected to said plate members and said spider, movable plunger members adapted to be actuated by said motors having portions arranged to extend in a plane located between and parallel to said plate members, a pair of oppositely arranged brake shoes each having a flange portion adapted to be frictionally engaged with the braking surface of said drum and a single web portion extending normal to and disposed centrally of the width of said flange portion, portions of said web projecting between said plate members and embraced thereby for guided movement relative thereto, means connecting a web portion of each shoe to the said portions of a plunger member, a pair of links positioned between and embraced by said plate members, each link having one end pivotally connected to the web portion of a brake shoe, the other end of each of said links being pivotally connected to an anchor seat.

12. In a brake assembly, a rotatable brake drum having an axially extending braking surface, a support, a spider member detachably connected to said support, a pair of spaced-apart, parallel, plate members projecting from the periphery of portions of said spider member and arranged to extend in a plane normal to the braking surface of said drum, a pair of link anchor seats formed on the side edges of said spider members between said plates, a pair of indentations formed in the side edges of each of said plate members, brake shoe actuating motors mounted in the indentations in said plate members, projections on said motors connected to said plate members and said spider, movable plunger members adapted to be actuated by said motors having thrust transmitting portions arranged to extend in a plane located between and parallel to said plate members, a pair of oppositely arranged brake shoes each having a flange portion adapted to be frictionally engaged with the braking surface of said drum and a web portion extending normal to and disposed centrally of the width of said flange portion and having portions projecting between and embraced by said plate members for guided movement relative thereto, means connecting a web portion of each shoe to a plunger member thrust transmitting portion, a pair of links positioned between and guidingly embraced by said plate members, each link having one end pivotally connected to the web portion of a brake shoe, the other end of each of said links being pivotally connected to a link anchor seat, resilient means positioned between said plates and connected between said spider member and an edge of each of said shoe web portions adapted to urge said shoes to retracted positions, and plate means frictionally embracing the side surfaces of said shoe web portions and said links to restrain relative pivotal movement between the shoes and links, and cam means mounted on and arranged to extend between said plate members having portions adapted to be engaged with the edges of the shoe web portions to limit the clearance between said shoes and said drum.

ROBERT F. SMITH.

REFERENCES CITED

The following references are of record in the file of this patent:

UNITED STATES PATENTS

| Number | Name | Date |
| --- | --- | --- |
| 1,832,135 | Oliver | Nov. 17, 1931 |
| 1,886,811 | Huck | Nov. 8, 1932 |
| 2,026,401 | Rockwell | Dec. 31, 1935 |
| 2,034,088 | Condon | Mar. 17, 1936 |
| 2,082,229 | Stoner | June 1, 1937 |
| 2,136,194 | Majneri | Nov. 8, 1938 |
| 2,287,261 | McColgan | June 23, 1942 |
| 2,365,715 | Mattersdorf | Dec. 26, 1944 |
| 2,366,111 | Jacobi | Dec. 26, 1944 |

FOREIGN PATENTS

| Number | Country | Date |
| --- | --- | --- |
| 357,367 | Great Britain | Sept. 24, 1931 |
| 574,103 | Great Britain | Dec. 20, 1945 |